United States Patent
Schwaerzler et al.

(10) Patent No.: US 6,962,308 B2
(45) Date of Patent: Nov. 8, 2005

(54) CONTROL UNIT FOR CONTROLLING PARAGLIDERS, UNLATCHING APPARATUS FOR TRIGGERING A FLARING MANEUVER TO BE CONDUCTED BY A LOAD-BEARING PARAGLIDER SYSTEM, AND A PARAGLIDER SYSTEM

(75) Inventors: Hans-Juergen Schwaerzler, Taufkirchen (DE); Horst Christof, Aying (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/655,544

(22) Filed: Sep. 5, 2003

(65) Prior Publication Data

US 2004/0169111 A1 Sep. 2, 2004

(30) Foreign Application Priority Data

Sep. 5, 2002 (DE) .......................................... 102 41 585

(51) Int. Cl.[7] .............................................. B64D 17/59
(52) U.S. Cl. ....................................................... 244/149
(58) Field of Search ............................. 244/152, 138 R, 244/142, 151 B, 900

(56) References Cited

U.S. PATENT DOCUMENTS

| | | | | |
|---|---|---|---|---|
| 975,281 | A | * | 11/1910 | Rectenwald ............ 244/138 R |
| 2,308,797 | A | * | 1/1943 | Nasca ......................... 244/142 |
| 2,610,008 | A | * | 9/1952 | Smith ......................... 244/152 |
| 3,117,753 | A | * | 1/1964 | Ewing ........................ 244/145 |
| 3,146,976 | A | * | 9/1964 | Houdou ...................... 244/152 |
| 3,315,921 | A | * | 4/1967 | Riley et al. ................. 244/152 |
| 3,433,441 | A | * | 3/1969 | Cummings ............. 244/138 R |
| 5,557,397 | A | * | 9/1996 | Hyde et al. ................. 356/5.01 |
| 5,678,788 | A | * | 10/1997 | Hetzer et al. ............... 244/152 |
| 6,416,019 | B1 | | 7/2002 | Hilliard et al. |
| 6,505,793 | B2 | * | 1/2003 | Schwarzler ................. 244/142 |

FOREIGN PATENT DOCUMENTS

| | | | |
|---|---|---|---|
| DE | 4433211 C1 | 1/1996 | |
| DE | 19634017 A1 | 2/1998 | |
| DE | 196 10052 C2 | 7/1998 | |
| DE | 199 60 332 | 2/2001 | |
| EP | 1108647 A1 | 6/2001 | |
| FR | 669225 | 11/1929 | |
| FR | 2480705 | * 10/1981 | ................. 244/152 |

OTHER PUBLICATIONS

European Search Report mailed Oct. 22, 2003.

* cited by examiner

*Primary Examiner*—Tien Dinh
(74) *Attorney, Agent, or Firm*—Crowell & Moring LLP

(57) ABSTRACT

A load-bearing paraglider system includes a load-bearing paraglider with a trailing edge, paraglider straps that connect the load-bearing paraglider with a control unit, and a load suspended on the load-bearing paraglider using load-bearing straps. At least one flaring strand is connected with the trailing edge for implementing control and curved flight maneuvers on the basis of activating the flaring strand using the force of the weight of the load. The control unit has a transmission unit with at least two load-bearing rollers for same direction rolling up of load-bearing straps or paraglider straps as well as at least one flaring strand roller for accommodating a flaring strand whereby the at least one flaring strand is rolled up on the allocated flaring strand roller. The load-bearing strap or the paraglider straps are rolled off in a predetermined direction of rotation with at least one flaring strand being rolled up in the same direction of rotation. An unlatching apparatus is provided for unlatching the transmission unit upon attaining a target altitude.

26 Claims, 10 Drawing Sheets

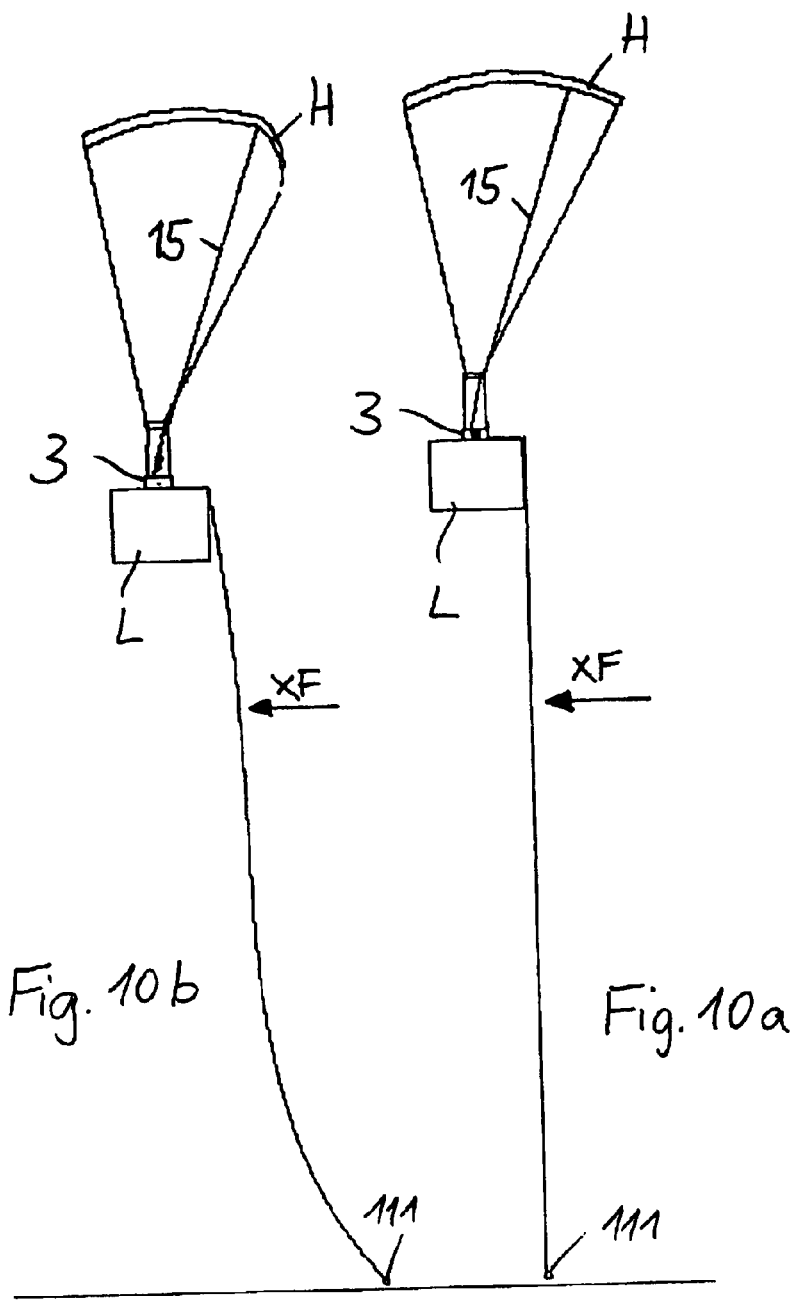

US 6,962,308 B2

CONTROL UNIT FOR CONTROLLING PARAGLIDERS, UNLATCHING APPARATUS FOR TRIGGERING A FLARING MANEUVER TO BE CONDUCTED BY A LOAD-BEARING PARAGLIDER SYSTEM, AND A PARAGLIDER SYSTEM

BACKGROUND AND SUMMARY OF THE INVENTION

This application claims the priority of German Application No. 10241585.4 filed Sep. 5, 2002, the disclosure of which is expressly incorporated by reference herein.

The invention concerns a control unit for controlling paragliders, an unlatching apparatus for triggering a flaring maneuver to be conducted by a load-bearing paraglider system, and a paraglider system.

A support and adjusting system with a control unit for executing controlled and curved flight maneuvers with a load-bearing paraglider with trailing edges is known from German Patent Document DE 199 60 332 C1 (corresponding U.S. Pat. No. 6,505,793). Executing the maneuvers takes place by utilizing the force of the weight of the load, in which an electric motor for driving the cable drum upon which control lines are rolled up, a transmission unit and a brake apparatus are interposed between the control unit connected with the trailing edges and the load.

It is an object of the invention to furnish a load-bearing paraglider system as well as an associated control unit for controlling paragliders with which improved landing of unmanned paragliders is made possible.

A further object of the invention is to furnish a latching apparatus for a control unit of this type that is simply constructed and can be triggered for a flaring maneuver.

These objectives are achieved by preferred embodiments of the invention which have a load bearing paraglider system including a control mechanism for controlling a paraglider aerodynamic shape to influence flight characteristics utilizing gravity forces acting on the load upon relative movement of the load and the paraglider carrying the load, said control mechanism comprising: a rotative load bearing roller with a load bearing strap wound thereon which in use supports the load, a rotatable flaring strand roller with a flaring strand wound thereon which flaring strand in use is connected with an air foil control section of the paraglider, said load bearing roller and said flaring strand roller being coupled to one another such that when rotated together in one rotational direction, the load bearing strand is unwound from the load bearing roller and the flaring strand is wound onto the flaring strand roller whereby the distance between the flaring strand roller and the air foil control section of the paraglider is shortened to thereby move the air foil section when the load bearing roller is rotated in said rotational direction by load forces from the load acting on the load bearing strap, a latching mechanism operable to selectively latch the load bearing roller and flaring strand roller to permit rotation, and a controller responsive to a signal indicative of a distance between a local ground surface and the load to control unlatching of the latching mechanism.

These objectives are also accomplished with the preferred embodiments of the invention as set forth herein.

In accordance with certain preferred embodiments of the invention, a control system is provided for a load-bearing paraglider system with a load-bearing paraglider with trailing edges and with at least one flaring strand connected with the trailing edge for implementing flared and curved flight maneuvers using the force of the weight of the load. Straps that connect the load-bearing paraglider with a control unit are provided as control lines which are rolled up on an unrolling unit of a transmission unit of the control unit. The unrolling roller is connected with a braking apparatus and the unrolling unit has at least two load strap rollers for same direction rolling up of respectively two load straps as well as at least one flaring strand roller for accommodating a flaring strand, whereby the at least two load strap rollers are coupled by a rotational axle in the direction of rotation, and at least one flaring strand roller is coupled with the load strand rollers and is rolled up on the flaring strand roller such that the load straps are rolled off in a predetermined direction of rotation when the at least one flaring strand is rolled up in the same direction of rotation. In certain preferred embodiments of the invention, an unlatching apparatus for unlatching the unrolling unit and a laser altitude measuring unit is provided for measuring the altitude above ground and a comparison apparatus for comparing the measured altitude with a target altitude that is functionally connected with the unlatching apparatus are provided, whereby the unlatching device is unlatched when the target altitude is attained.

An advantage of preferred embodiments of the invention is that the high energy requirement for controlling a load-bearing paraglider with a load is furnished with an economical solution. Through the solution of the invention, the additional use of expensive positioning drives such as, for example, electric motors with heavy batteries, safety-critical pyrotechnics, hydraulics, internal combustion motors, pneumatics or tension springs are avoided.

Through the solution of certain preferred embodiments of the invention, the trailing edge rate of adjustment and the trailing edge adjustment path can be set simply.

Other objects, advantages and novel features of the present invention will become apparent from the following detailed description of the invention when considered in conjunction with the accompanying drawings.

BRIEF DESCRIPTION OF THE DRAWINGS

FIGS. 10a and 10b illustrate two successive flight phases or situations using the design of the unlatching apparatus according to FIG. 9, whereby FIG. 10a illustrates the situation before and FIG. 10b illustrates the situation following activation of the trailing edge control.

DETAILED DESCRIPTION OF THE DRAWINGS

Figure 1:
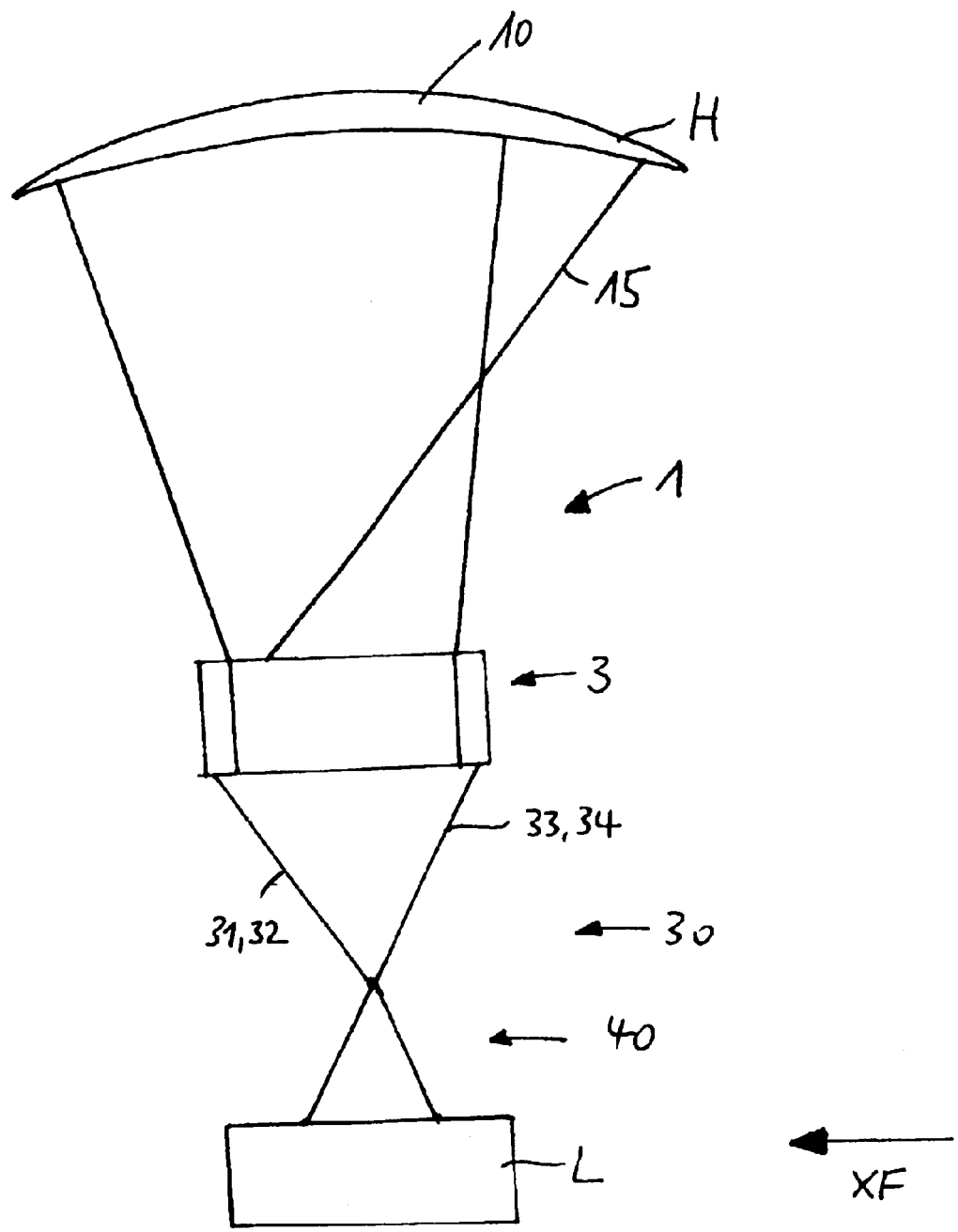
FIG. 1 is a schematic side view of a paraglider system with an adjustable flaring strand and a control unit for adjusting the flaring strand by lowering the load carried by the paraglider, constructed according to preferred embodiments of the invention.

The control system for a load-bearing paraglider system 1 has a control unit 3 with a supporting frame or box 5 on which paraglider straps 11, 12, 13, 14 are fastened. The control unit 3 is supported by the paraglider straps at the load-bearing paraglider 10, referred to hereinafter as a paraglider or load-bearing paraglider. At least one flaring line or flaring strand 15, 15a, 15b leads from the paraglider 10 to the control unit 3, which control unit has a transmission unit 20 on which at least one flaring strand 15, 15a, 15b can be rolled up and out. An unlatching unit 21 is allocated for unlatching the transmission unit 20.

The load L hangs by means of suspension device 30 including load-bearing straps 31, 32, 33, 34 connected with transmission unit 20. The suspension device 30 can be coupled with a further suspension device 40 originating from the load L.

The suspension device 30 is preferably configured such that the latter represents a three point suspension to the connection points on the load L or the coupled on additional suspension device. The three point suspension is realized, for example, by the load-bearing straps 33, 34 respectively 31, 32, and the corresponding guides at to the respective load-bearing rollers. In this way, level restraining and moving of the load L is guaranteed during the flight and even during a flaring maneuver.

The control unit 3 has an axis A—A extending in the direction of flight XF to the extent that side winds are not taken into consideration. A flaring strand roller FR1 or FR2 and a load-bearing strap roller or a load-bearing roller LR1 or LR2 are arranged respectively on either side of axis A—A as components of the transmission unit 20. The pairs comprising a flaring strand roller and a load-bearing strap roller situated on each side of axis A—A are fixed in position in the direction of rotation using suitable fastening equipment. Furthermore, the two pairs of one flaring strand roller and one load-bearing roller are disposed respectively on each side of the transmission unit 20 by an axle 50 that is rotatably supported in the supporting frame 5 or in the control unit 3.

Additionally, a braking line and roller unit BR is arranged on one of the two sides and connected securely with the rollers of this side.

A first load-bearing strap 31 and a second load-bearing strap 32 are rolled up in the same direction on load-bearing roller LR1 of the first side in relation to axis A—A. Analogously, a first load-bearing strap 33 and a second load-bearing strap 34 are rolled up in the same direction on load-bearing strap roller LR2 of the second side in relation to axis A—A. In this way, insofar as the load-bearing straps 31, 32 or 33, 34 are rolled up in the same direction, both sets of load-bearing straps 31, 32 or 33, 34 are rolled off simultaneously and rolled on simultaneously in opposite directions of rotation of the rollers.

Figure 3:
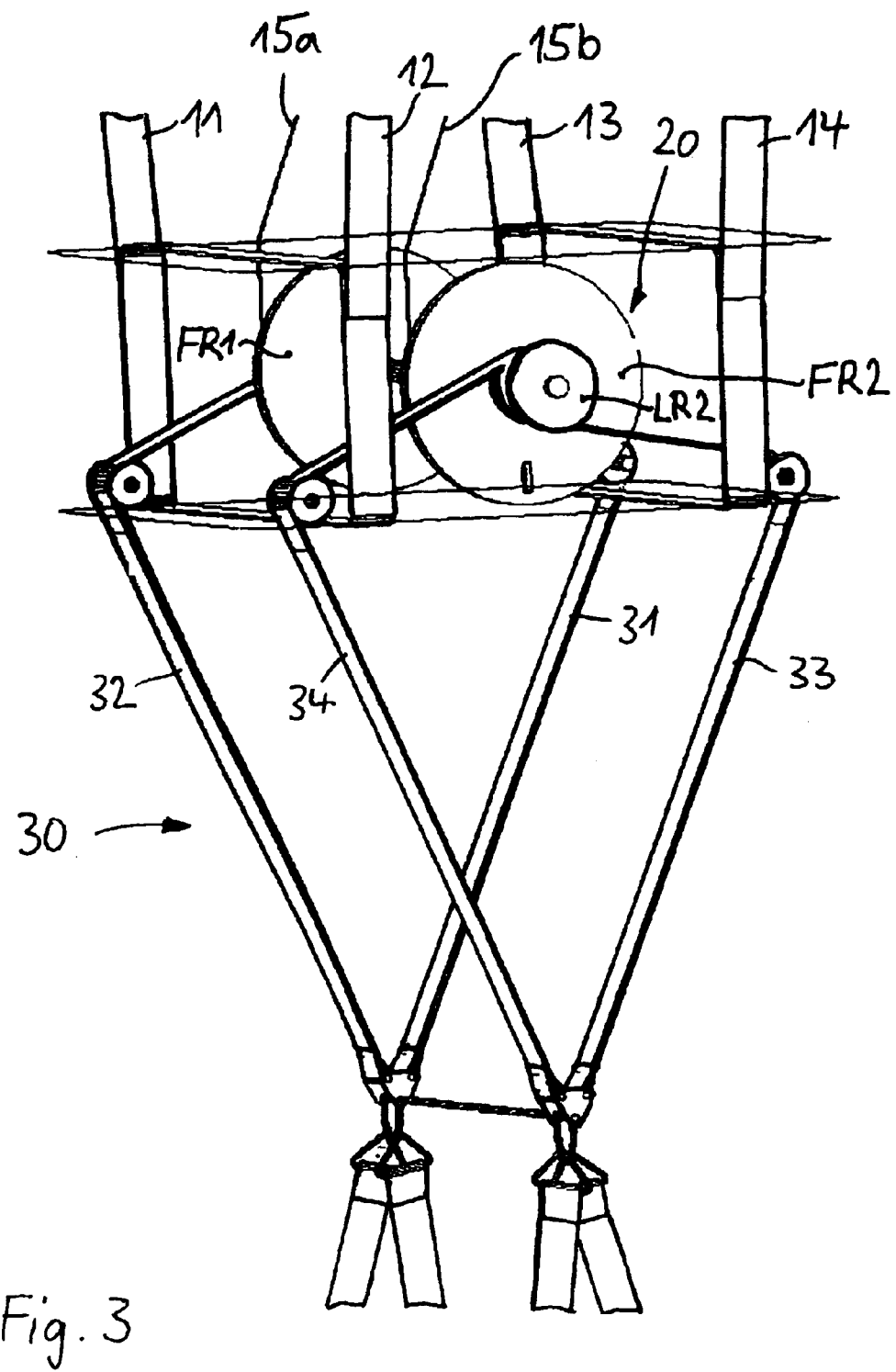
FIG. 3 is an enlarged perspective representation of a section of the control unit of the paraglider system according to FIG. 1, showing segments of the flaring strands and the load-bearing straps, whereby basically only the flaring set roller and the load-bearing strap rollers are represented.

The at least one flaring strand 15, 15a, 15b is rolled up on the flaring strand roller FR1 or FR2 and thereby shortened when the roller FR1 or FR2 are rotated in the mentioned direction of rotation D1. One flaring strand roller FR1 or FR2 is represented by way of example on each side of axis A—A in FIGS. 3 and 4. These two flaring strand rollers FR1 and FR2 are fixed in position in the direction of rotation with respective load-bearing roller LR1 or LR2 of the same side.

The trailing edge flaps H connected by the flaring stands wound on the flaring strand rollers FR1 and FR2 are pressed downward, thus toward the ground, as an effect of the rotation of the load-bearing strap roller LR1 or LR2 and the simultaneous rotation oft he flaring strand rollers FR1 and FR2 in the rotation direction D1. In this way, the lifting force of the paraglider 10 is increased and the rate of fall of the load-bearing paraglider system 1 is diminished. Thus, it is assured that the load is placed on the ground at a lower speed than if no flaring maneuvers were being executed. The danger of damage to load L is diminished by executing this flaring maneuver.

Figure 5:
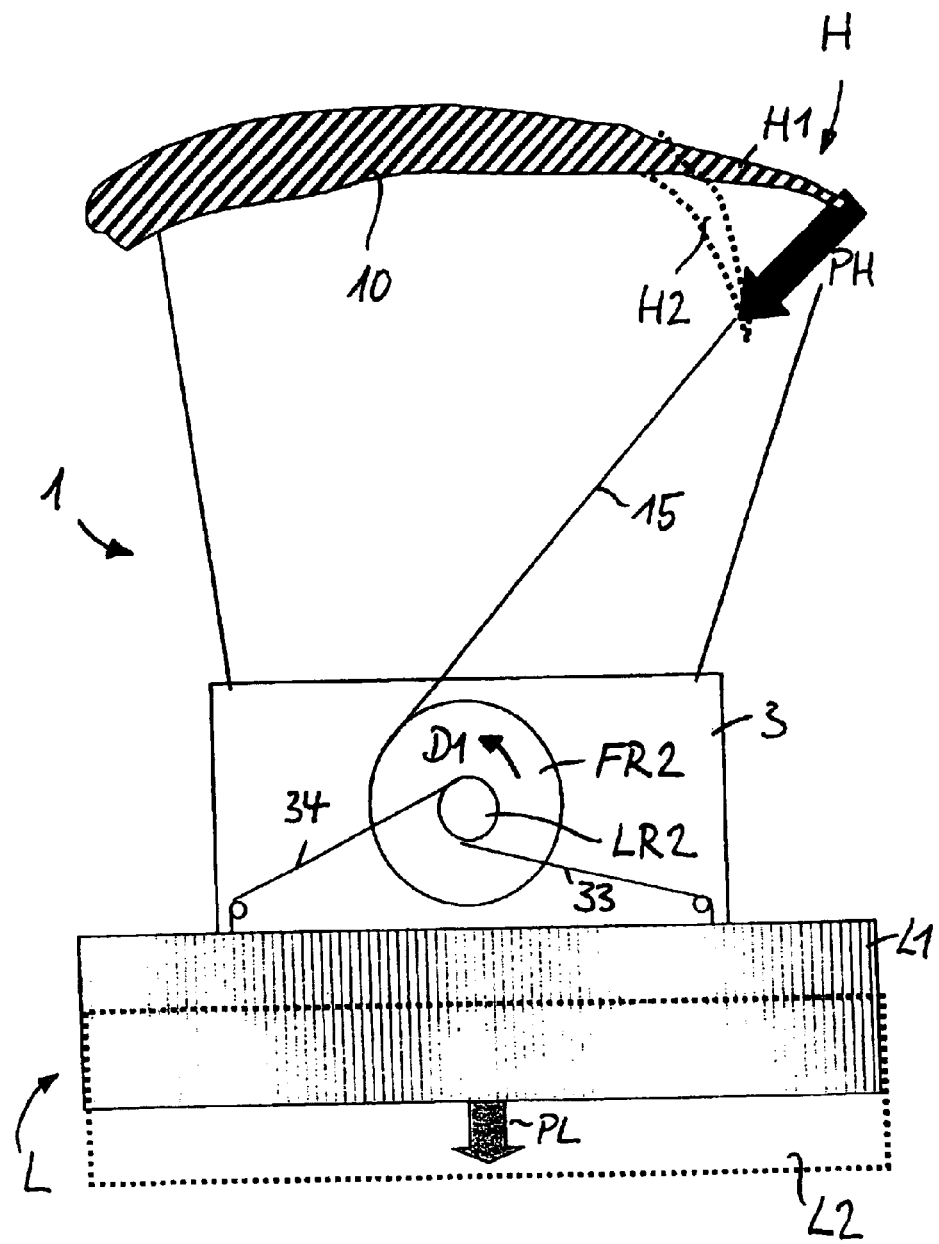
FIG. 5 is a schematic representation of the paraglider system according to FIG. 1 showing the principle of load lowering relative to the control unit to extract energy from this load lowering motion for controlling the trailing edge of the paraglider.

The principle of load lowering is schematically represented in FIG. 5. The reference number L1 points to the position of the load L prior to lowering, and reference number L2 points out the position of the load L after lowering relative to the control unit 3 by the control unit. The change in the load position is indicted with the arrow PL. Correspondingly, the reference number H1 points out the position of the trailing edge H before lowering or pulling of same and reference number H2 points to the position of the trailing edge H after lowering or pulling of same by the control unit 3. The change in the trailing edge position is indicated with the arrow PH.

Figure 6:
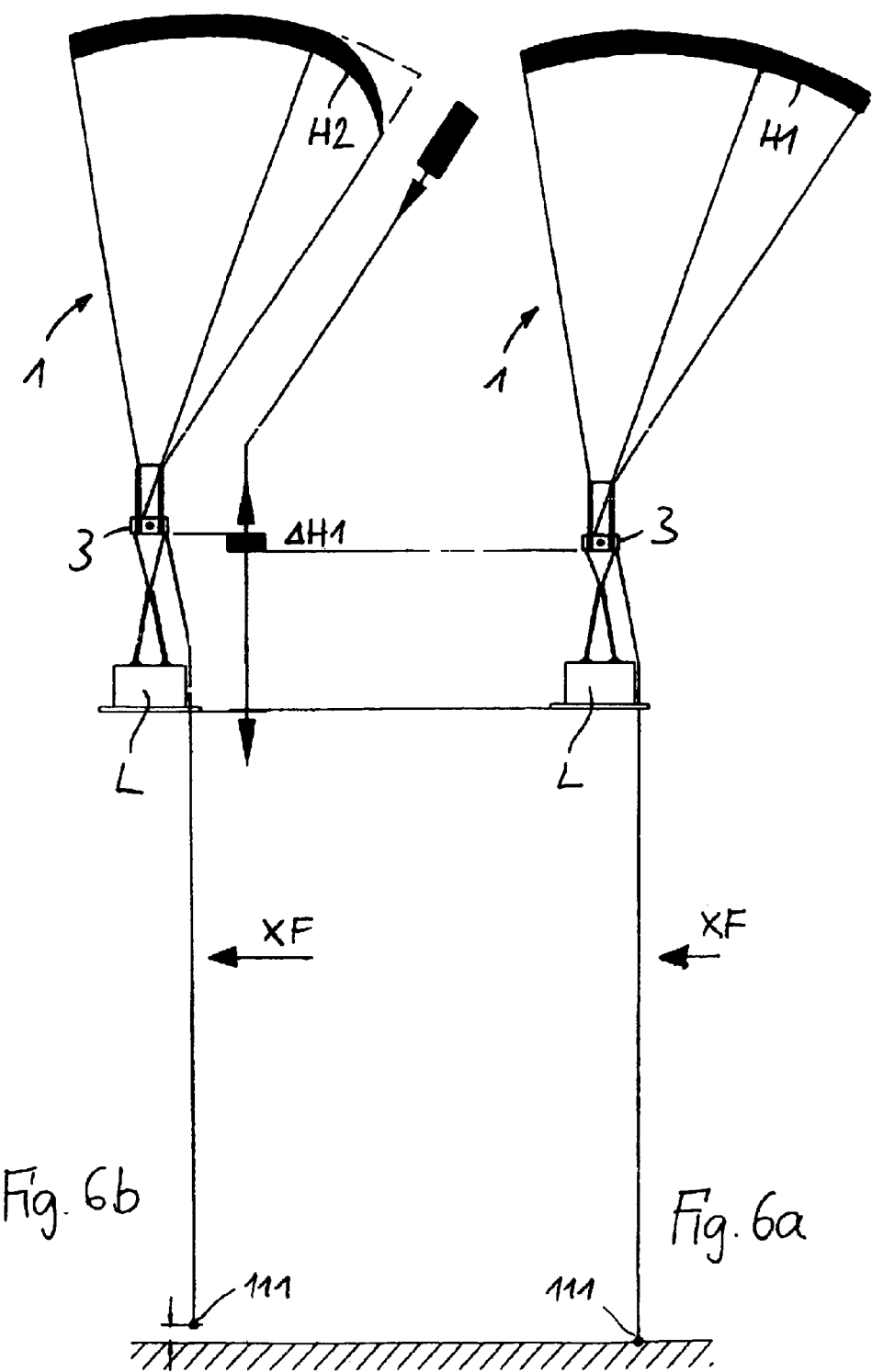
FIG. 6a is a schematic representation of the mode of functioning of the laser altitude measuring unit for triggering the activation of the trailing edge control of the load-bearing paraglider, shown prior to lowering of the load.
FIG. 6b is a schematic representation of the functioning of the laser altitude measuring unit for triggering the activation of the trailing edge control of the load-bearing paraglider and the function of the load lowering.

In FIGS. 6a and 6b, in which the reference numbers from FIG. 5 are adopted for analogous features, the flying altitudes above a fictive, completely flat ground are schematically represented before and after lowering the load. It becomes apparent from a comparison of FIGS. 6a and 6b that, owing to the relatively large mass of load L, the altitude above the ground remains basically unchanged when the load lowering is conducted, so that the danger of damage to the load when executing the flaring maneuver is slight.

Figure 2:
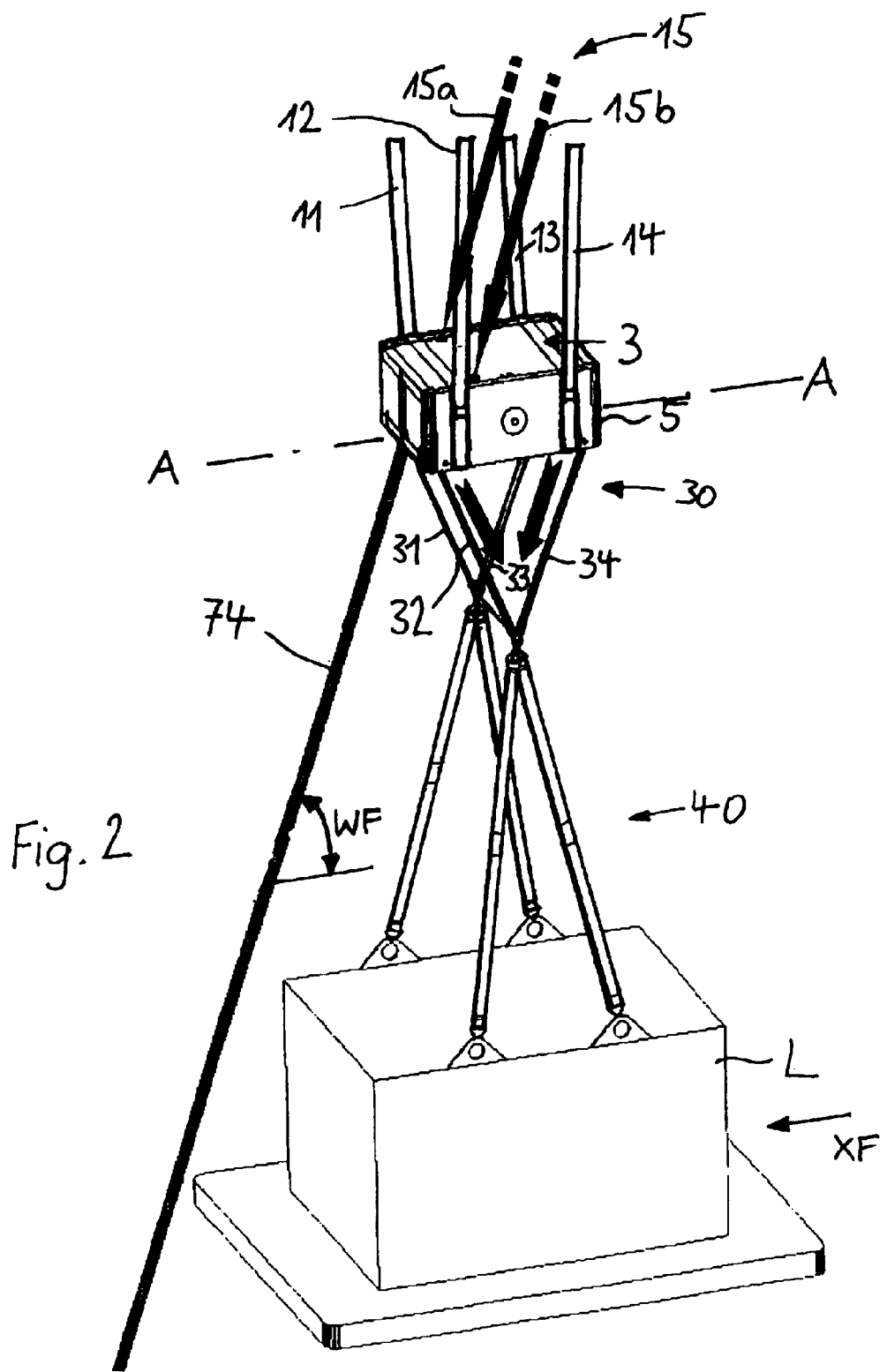
FIG. 2 is a perspective representation of a section of a paraglider system with a control system of the invention according to FIG. 1, showing segments of the flaring strands, the control unit, the load-bearing straps, the load and a schematically depicted laser altitude measuring unit.

Furthermore, a controlling unit 70 is arranged in or on control unit 3 or at another place in the load-bearing paraglider system 1 that is functionally connected with the unlatching device 21. The controlling unit 70 includes a laser altitude measuring unit 71 for measuring the momentary altitude of load L above ground and especially the momentary altitude above ground of the underside of load L facing the ground. These altitudes can be derived from the measurement of the momentary altitude of the laser altitude measuring unit above ground. A comparison apparatus (not represented) is functionally connected with the laser altitude measuring unit 71 that compares the momentary ascertained or derived altitude with a target altitude. For example, a line of sight 74 or the beam of the laser altitude measuring unit provided in accordance with the invention is entered as shown in FIG. 2. The angle of measurement WF (FIG. 2) of the laser beam 74 in relation to a fictive flat ground is preferably provided in the 60 to 80 degree range. At this angle, a disturbance by load L is largely avoided. Upon reaching the target altitude, a signal is transmitted to a switching apparatus functionally allocated to the comparison apparatus on the basis of which the unlatching apparatus 21 is unlatched. In this way, the transmission unit 20 with the flaring strand rollers FR1, FR2 and the load-bearing rollers LR1, LR2 is triggered, as a result of the suspension device 30 or its load-bearing straps 31, 32, 33, 34, and therewith the load, is lowered on the basis of the action of the force of weight of load L. Owing to the action of the force of the weight of load L, the trailing edge flap H is pressed downward in the manner described to execute a flaring maneuver.

The unlatching device 21 with an unlatching bolt 27 preferably has a cutting device 23 that is activated by the signal from the comparison apparatus. A traction rope is cut through when the cutting device 23 is activated. This is achieved with an unlatching bolt 27 pivoted on a axis of rotation axle 26 and prestressed into the latching position of the unlatching device 21 such that when the traction rope is cut through, the unlatching bolt 27 is loosened and this unlatches the transmission unit 20 to execute the flaring maneuver.

The engagement and unlatching of the transmission unit 20 can also be realized with other apparatus according to the state of the art. What is important is that the transmission unit is unlatched by an unlatching apparatus 21 upon a corresponding signal by the comparison apparatus.

Furthermore, a braking apparatus 80, preferably in the form of an oil brake or dashpot, can be provided, by means of which the speed of the flaring strand 15 movement can be adapted when the transmission unit 20 is triggered through adjusting the braking action, for example, by way of the oil pressure. For this, a brake cylinder 81 is provided with a mounted dampening braking strand 82 that is rolled up on the rotation axle 50 or a roller fastened into position with roller 85.

Latching elements can be provided on the transmission unit 20 and especially on one of the flaring strand rollers FR1, FR2 or the load-bearing strap rollers LR1, LR2 that fix various latching positions of the transmission unit 20 in interaction with a transmission latching apparatus (not shown). The flaring traction path can be adapted through these latching positions to achieve various lift actions over time during flaring.

The adjustment of the braking action and/or the adjustment of the flaring traction path can take place manually using an adjustment apparatus or through a regulation or controlling apparatus, such as the controlling unit 70.

Figure 4:
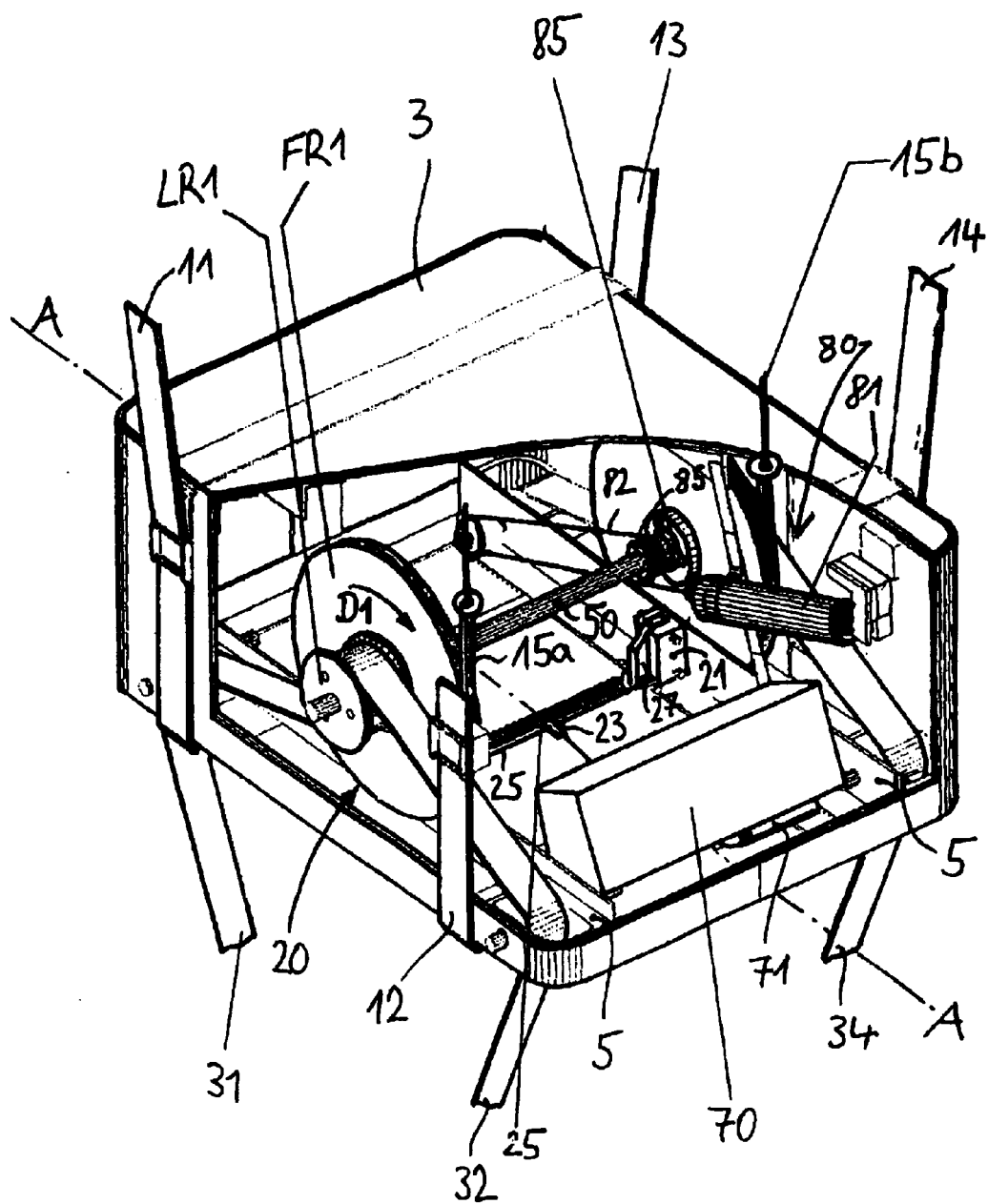
FIG. 4 is a perspective partially cut away schematic representation of a design of the control unit of the paraglider system according to FIG. 1 in a detail view showing segments of the adjustable flaring strands and the load-bearing straps.
Figure 7:
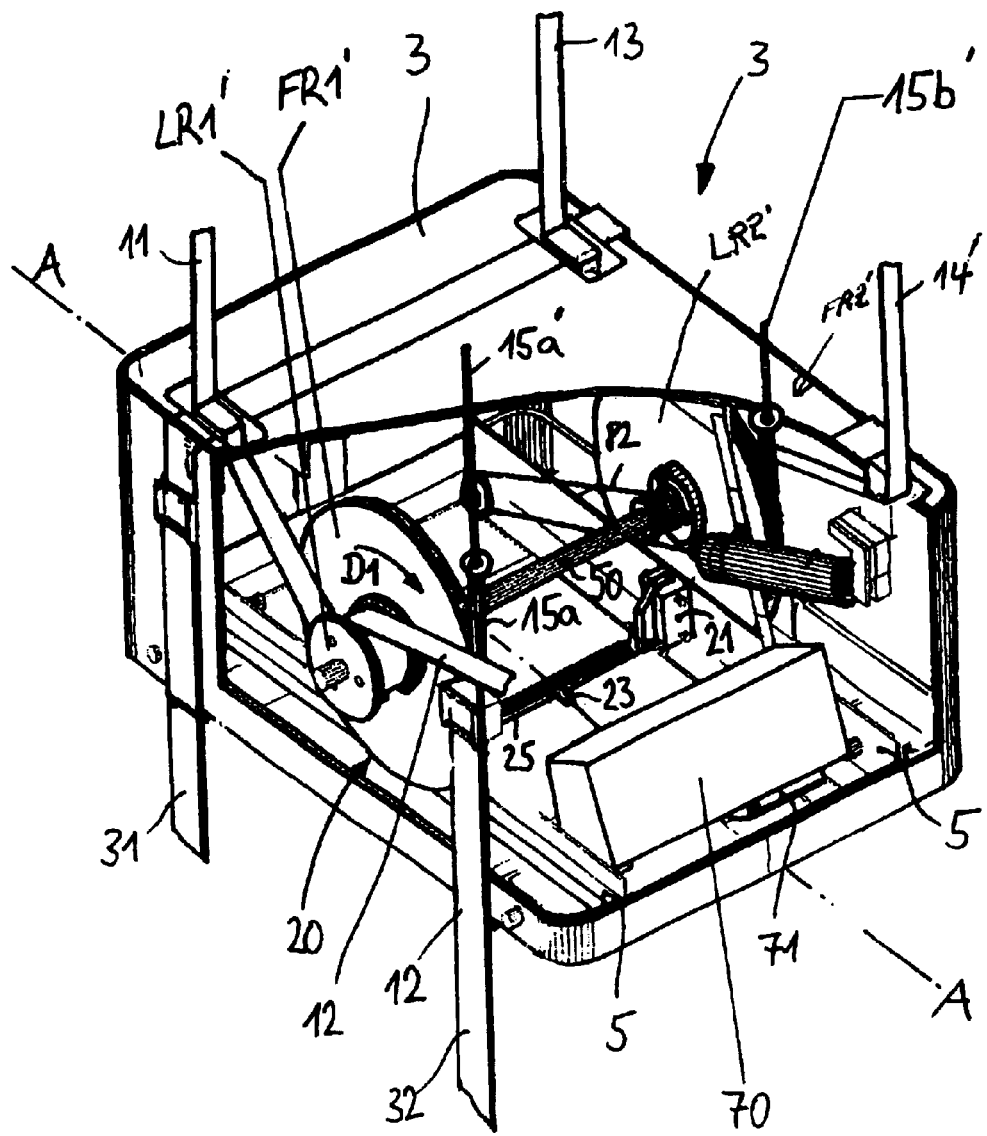
FIG. 7 is a perspective, partially cutaway schematic representation of a further embodiment of a control unit according to the principle of a paraglider rising for activation of the trailing edge control of the load-bearing paraglider.
Figure 8:
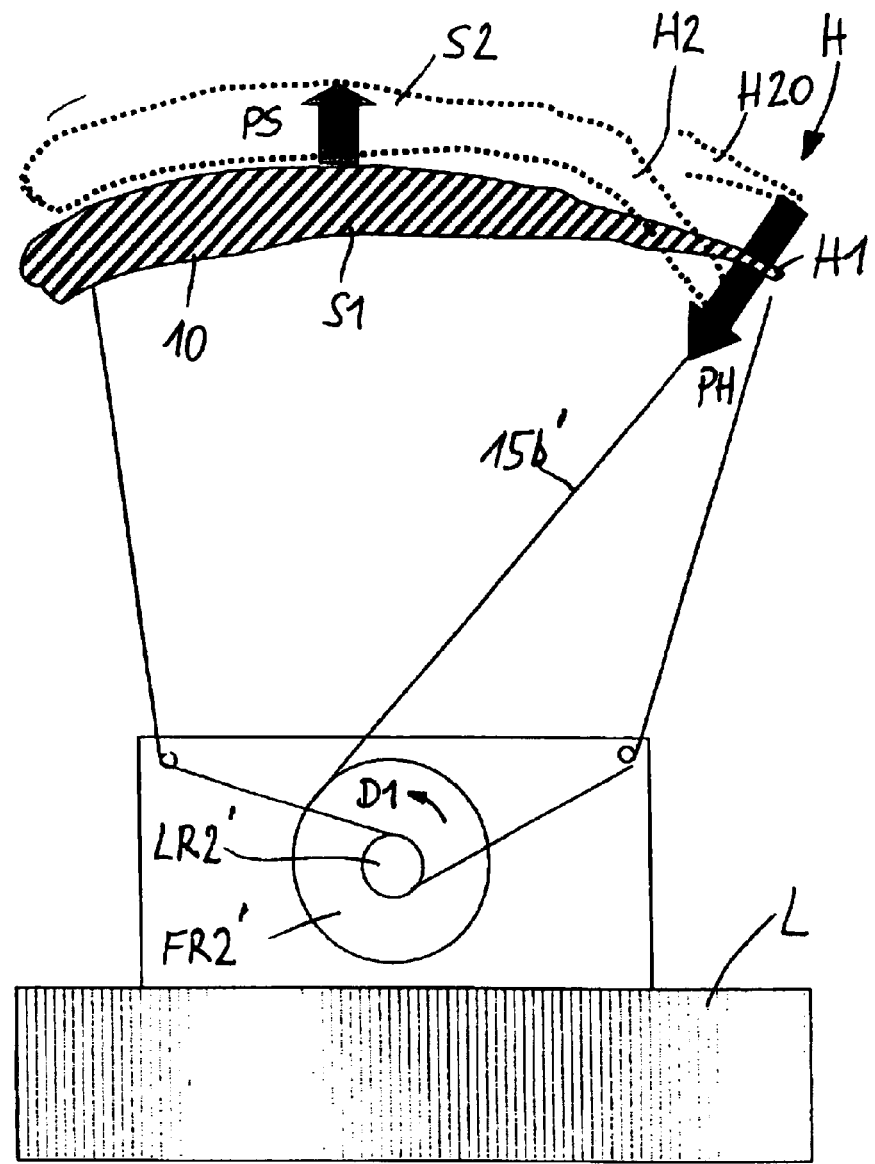
FIG. 8 is a schematic representation of the paraglider system with a control unit according to FIG. 7 and the principle of functioning of the paraglider rising relative to the control unit utilizing energy extracted therefrom for the movement of the trailing edge of the paraglider.

A further design of the control apparatus 3 of the invention in comparison with FIGS. 4 and 5 is represented in FIGS. 7 and 8 that operates according to the principle of load-bearing paraglider lifting for maneuvering using the force of the weight of the load. In these FIGS. 7 and 8, features of analogous functions are designated with the same reference numbers as in the preceding Figures discussed above. Only modifications from the previously described designs will be referred to in the following description of the embodiment of FIGS. 7 and 8. In this further design of the control unit, two paraglider straps, for example paraglider straps 11,12 or 13,14 are rolled up pair-wise in the same direction on the load-bearing rollers LR1 or LR2. The flaring strands 15a; 15b, are rolled up on the flaring rollers FR1, FR2 so that during rotation of the combination of load-bearing and flaring strand rollers in a direction of rotation D1, the load-bearing straps 11,12; 13,14 are rolled off and the flaring strands 15a; 15b are rolled up. By rolling off the load bearing paraglider straps 11,12; 13,14, the paraglider 10 is raised relative to the control unit 3.

The rotation axle 50 can also be divided to gain installation space in the control unit according to other non-illustrated preferred embodiments. In a preferred design of control unit 3, a coupling of the roller pairs LR1, FR1 or LR2, FR2 is dispensed with in this case. It was shown in experiments that this decoupled design delivers sufficient stability with respect to the position of the load L relative to control unit 3 or the load-bearing paraglider 10.

In FIG. 8, the principle of this load-bearing paraglider lifting for maneuvering while utilizing the force of the weight of the load is schematically represented. The reference number S1 refers to the position of the load-bearing paraglider 10 before lifting and reference number S2 refers to the position of the load-bearing paraglider 10 following lifting relative to the control unit 3 by the control unit assembly described above. The change in the paraglider position is indicated with the arrow PS. Correspondingly, the reference number H1 refers to the position of the trailing edge H prior to lowering or pulling and reference number H2 refers to the position of the trailing edge H after lowering thereof by the lifting of the paraglider 10 by the control unit 3. The change in the trailing edge position is indicated with the arrow PH.

The distance between the control unit 3 and the load L remains in this design unchanged during the flaring maneuver while the distance between the load bearing paraglider 10 and the control unit 3 is extended, meaning that the control unit 3 can be mounted with the appropriate fasteners tightly to the load whereby the appropriate load-bearing straps for attaching the load at a distance from the control unit can be dispensed with.

In a preferred design, a transmission ratio preferably between 1:3 and 1:5 is provided in the control unit. Alternatively or additionally, the kinematics in relation to the activation of the paraglider straps and control units are designed so that the load L drops during the paraglider lifting phase owing to acceleration due to gravity by 5 to 15% of the path by which the paraglider rises.

To trigger the flaring maneuver, a flaring triggering apparatus is provided which has an altitude sensor for measuring the momentary altitude of load L, or another reference point of load-bearing paraglider system 1, a comparison apparatus for comparing the measured altitudes with a target altitude, and an unlatching device, whereby the comparison apparatus triggers and activates the unlatching device 21 directly or through further functions or circuits.

Basically, the flare triggering apparatus can be provided with a time delay circuit to delay temporally the unlatching of the transmission unit 20 after attaining the predetermined target altitude.

The transmission unit 20 is unlatched by the unlatching device 21 for triggering the flaring maneuver upon a corresponding signal of the comparison apparatus. A design of the unlatching apparatus 21 with cutting device 23 interacting with a traction rope and an unlatching bolt 27 prestressed into the latching position is represented in FIG. 4.

Figure 9:
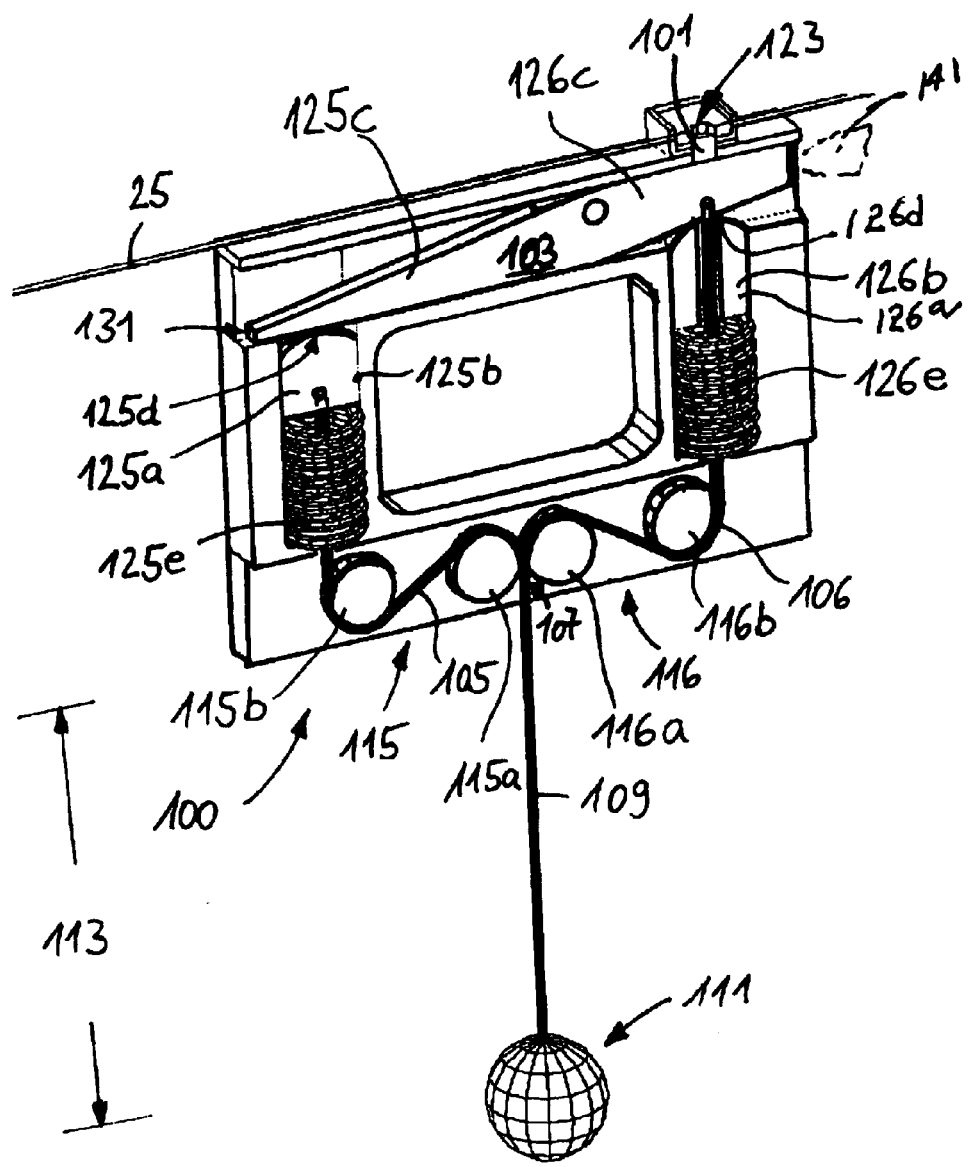
FIG. 9 is a perspective, partially cutaway schematic illustration of a design of an unlatching apparatus with a design of the altitude sensor unit for triggering the process of activating the trailing edge control, constructed according to a preferred embodiment of the invention.

A further design of an unlatching apparatus 21 or a flaring triggering apparatus 100 with the comparison apparatus for comparing a target altitude above ground with an actual altitude is represented in FIG. 9. Here a latching element 101 is provided that can interact with the axle of rotation 50 and/or with a load-bearing roller or flaring strand roller or with the design without a common axle of rotation, with the load-bearing rollers or the flaring strand rollers on both sides of the axis of reference A. Alternatively, the latching element 101 can interact with a locking device 123 (not shown in detail) with which two parts of the traction rope 25 are held together and consequently the transmission unit 20 is held in its latched position.

The unlatching apparatus 21 or flaring triggering apparatus 100 with the comparison apparatus has a weight 111 hanging down a specified distance 113 on a measuring strand 109 from the flaring triggering apparatus 100 or from the control unit 3, or has another measuring element. The specified distance 113 corresponds (as apropriate, taking the magnitude of the weight 111 into consideration) to a specified target altitude that is to be measured and scanned to trigger the flaring maneuver. The unlatching apparatus 100 is activated when the weight 111 or the measuring element touches the ground upon which the landing is to take place as well as when the weight 111 engages obstacles on the ground.

One design of the unlatching apparatus 100 with the latching element 101 is activated by a compensation apparatus in the form of a pivoted balancing beam forming two lever arms 125c, 126c, whereby the latching element 101 is movable with the load of the weight 111 in the direction of the force of gravity as well as against this direction. A first prestress apparatus 125e operates in accordance with its deflection preferably using a guide element 125a on the first lever arm 125c, whereby the position of the first prestress apparatus 125e is determined by the tensile force of a first strand 105 connected with the weight 111. A second strand 106 connected with the weight 111 is connected with the second lever arm 126c to apply a tensile force thereon. Optionally, a second prestress apparatus 126e can act on this second lever arm 126e that exerts a spring force opposed to the tensile force exerted by the second strand 106. Conversely, the first spring apparatus can be dispensed with if at least one prestress apparatus is dimensioned corresponding overall with the length of the respectively effective lever arm. The compensation apparatus is in equilibrium together with the freely hanging weight 111 to the extent that this is loaded with a force in the direction of gravity or against gravity in a predetermined extent. The equilibrium can be stable, unstable or indifferent (neutral).

In the design depicted in FIG. 9, the first prestress apparatus 125e prestresses the balancing beam 103 on the first lever arm 125c in a first direction of rotation, while the second prestress apparatus 126e prestresses the balancing beam 103 on the second lever arm opposed to the first direction of rotation. Furthermore, the second strand 106 and the second prestress apparatus 126e engage at the same place on the second lever arm 126c. In this represented design, the first strand 105 and the second strand 106 are connected with a measuring strand 109 running outside the control unit, for example, through a fastening apparatus or a branching point 107. Only one of the strands can exert a tensile force on the compensation apparatus or the balancing beam. For this, the first strand 106 is passed over a first bearing 115 and is connected with a guide element 125a movable in a corresponding guide track 125b. The guide element 125a in operation engages with an application surface 126d on the first lever arm 125c of a compensation apparatus, especially in the form of a balancing beam 103 on the same. In this way, the guide element 125a can exert no tensile force on first lever arm 125c, but can exert a compressive force on the first lever arm 125c. The guide element 125a is prestressed by a prestress apparatus 125e, preferably in the form of a spring in the direction toward the balancing beam 103 and opposite to the tensile force exerted by the weight on the first strand 105, thus prestressed in the direction of a release of the first lever arm 125c. The second strand 106 is guided by a second bearing 116 to the second lever arm 126c of the balancing apparatus or the balancing beam 103 and is connected to said lever arm 126c. In addition, a second prestress apparatus 126e can engage on the second lever arm 126c opposite the tensile force of the weight 111.

The mode of functioning described can be attained in that the second lever arm 126c, that is shorter than the first lever arm 125c, is likewise prestressed using a prestress apparatus 126e, preferably in the form of a spring, against the tensile force exerted by the weight on the strand 106, thus likewise in the direction of a release of the second lever arm 126c. In this arrangement, the guide element 125e can exert a tensile force and also a compressive force on the second lever arm 126c on the basis of the spring force of the prestress apparatus. A guide element 126b guided in a guide 126a can be provided between the second prestress element 126e and the second lever arm 126c that abuttingly interacts with an application surface 126d of the second lever arm 126c in operation.

The first lever arm 125c and the spring force engaging upon this as a function of the rotation position of the balancing beam as well as the second lever arm 125c and the spring forces engaging upon this as a function of the rotation position of the balancing beam as well as weight 111 are dimensioned so that the balancing beam 103 rotates in one and the same direction if the weight is acted upon in the direction of the force of gravity.

The length of the first lever arm 125c can be longer that the length of the second lever arm 125c. The length of the lever arms must be adjusted with the forces exerted by the weight on the beam and the forces exerted on the beam by at least one prestress apparatus to realize the mode of function described. The latching apparatus 101 can be activated as desired by the compensation apparatus that is provided so that upon stressing the second lever arm 126c or a motion of the same corresponding to stressing the second lever arm 126c, the latching element 101 is activated for unlatching or opening the locking device. In a special design of the unlatching element 100 represented in FIG. 9, the balancing beam is arranged in connection with a latching element 101 beneath the traction rope 25 so that when the second lever arm 126c is lowered, the traction rope 25 is divided. This takes place by moving the latching element 101 out of the locking device 123.

Further, an unlatching of the transmission unit 20 can generally take place through a first design of the flaring triggering apparatus 100 in which a latching element 101 is activated by a compensation element with a first longer lever arm 125c connected with a first strand and with a second shorter 1 ever arm 125b connected with a second strand that are rigidly connected with each other. Both strands 105, 106 are connected with a measuring strand 109 with a freely hanging weight 111 and prestressed opposite the direction of the tensile force exerted by the weight whereby both lever arms are in equilibrium in an initial position in which the weight is uninfluenced by the ground. The length of the measuring strand corresponds to a target altitude to be compared with the actual altitude above ground. The unlatching device 100 and therewith the latching element are activated when the measuring strand is acted upon with respect to weight, as well as when this is released with respect to weight, since in both cases the same direction of rotation of the lever arms 125c or 126c results. In one design, the latching element 101 is connected with the shorter lever arm 126c.

The bearings are preferably respectively constructed with a roller pair of a first roller 115a or 116a for diverting the strand part 105 or 106 coming from outside the triggering apparatus 100 and with a second roller 115b or 116b for diverting the strand element 105 or 106 coming from the first roll 115a or 116b. The rollers are mounted in the flaring triggering apparatus 100 or a supporting frame of the same. The bearings can also include transmission apparatus for influencing the equilibrium conditions.

In operation, the first prestress apparatus 125e presses against the force of the weight 111 against the first lever arm 125c while the second prestress apparatus 126e maintains the balancing beam 103 in equilibrium. It is assured through the flaring triggering apparatus 100 of the invention that an unlatching and consequently triggering of the flaring maneuver takes place when the weight 111 is raised relative to the load L or the control unit 3 is raised upon reaching a corresponding target altitude above ground as well as when the weight 111 remains hanging on the ground due to the cultivation conditions on the ground, thus, for example, due to vegetation.

In a first case, when the weight 111 is raised from the ground relative to load L or the control unit 3 upon reaching a corresponding target altitude above ground, the longer, first lever arm 125c is raised owing to its release, so that the second lever arm and therewith the latching element 101 connected with it is removed downward out of the locking device. In a second case, when the weight 111 remains hanging on the ground, the second lever arm 126c is pulled downward by means of the second strand 106 and the latching element 101 connected therewith is likewise pulled down and removed from the locking apparatus.

The motions of the latching element due to the motion of the compensation apparatus can also be controlled by other configurations of the triggering apparatus.

In a further design, a beam pivoted on one of its two sides or a swivel arm are used on which the weight engages by way of the measuring strand 109, which beam is in an equilibrium position due to at least one prestress apparatus. If the weight is stressed or released from stress, the swivel arm and consequently a latching element 101 connected therewith is moved to unlatch the transmission unit 20 in this way.

A further schematically depicted latching element 141 connected with the beam can be provided on the unlatch apparatus 100 to unlatching the beam. In this way, it is assured that the triggering of a flaring maneuver is first possible only following unlatching of element 141. This can also be used advantageously for accommodating releasing the weight 111 at a predetermined time or for throwing it into its freely hanging position on the unlatching apparatus 100 while this further latching element 141 still latches the beam. This prevents unlatching of the transmission unit 20 by this release or this throwing off of the weight 111.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control assembly for controlling a paraglider aerodynamic control surface to influence flight characteristics utilizing gravity forces acting on a load carried by a paraglider upon relative movement of the load and the paraglider, said control assembly comprising:
    a rotable load bearing roller with a load bearing strap wound thereon which in use supports the load,
    a rotatable flaring strand roller with a flaring strand wound thereon which flaring strand in use is connected with an air foil control section of the paraglider,
    said load bearing roller and said flaring strand roller being coupled to one another such that when rotated together in one rotational direction, the load bearing strand is unwound from the load bearing roller and the flaring strand is wound onto the flaring strand roller whereby the distance between the flaring strand roller and the air foil control section of the paraglider is shortened to thereby move the air foil section for flaring the paraglider when the load bearing roller is rotated in said rotational direction by load forces from the load acting on the load bearing strap,
    a latching mechanism operable to selectively latch the load bearing roller and flaring strand roller to prevent rotation thereof, and
    unlatching apparatus for unlatching the latching mechanism, and
    a controller responsive to a signal indicative of a distance between a local ground surface and the load to control unlatching of the latching mechanism.

2. A control assembly according to claim 1, wherein said load bearing roller and said flaring strand roller are mounted on a control unit along with the latching mechanism.

3. A control assembly according to claim 2, wherein said control unit is connected in use by paraglider straps with the paragrlider, and
    wherein said control unit is connected by said load bearing strap with a load.

4. A control assembly according to claim 2, wherein said control unit is connected by paraglider straps with the paraglider,
    wherein said control unit is fixedly connected with a load, and
    wherein said load bearing strap is one of said paraglider straps,
    whereby the flaring strand is rolled up on the flaring strand roller upon rotation of said load bearing roller in said rotational direction with consequent raising of the paraglider with respect to the load.

5. A control assembly according to claim 1, comprising:
    a pair of said load bearing straps and associated load bearing rollers; and
    a pair of said flaring strands and associated flaring strand rollers.

6. A control assembly according to claim 2, comprising:
    a pair of said load bearing straps and associated load bearing rollers, and
    a pair of said flaring strands and associated flaring strand rollers.

7. A control assembly according to claim 3, comprising:
    a pair of said load bearing straps and associated load bearing rollers, and a pair of said flaring strands and associated flaring strand rollers.

8. A control assembly mechanism according to claim 4, comprising:
a pair of said load bearing straps and associated load bearing rollers, and
a pair of said flaring strands and associated flaring strand rollers.

9. A control assembly according to claim 1, wherein said controller includes a laser altitude measuring unit for measuring the altitude above ground of the paraglider system.

10. A control assembly according to claim 1, wherein the unlatching apparatus has an unlatching bolt prestressed with a traction rope into its latching position and a cutting device interacting with the traction rope, whereby the cutting device can cut through the traction rope upon a signal from the controller to unlatch the latching mechanism to conduct a flaring maneuver.

11. A control assembly according to claim 1, wherein at least two of said load-bearing rollers are coupled respectively with one or said flaring strand rollers for accommodating one flaring strand each, whereby the two pairs of one flaring strand roller and a load-bearing strap roller respectively are rotationally coupled on each side of a transmission unit in reference to the flight direction by a rotational axle.

12. A control assembly according to claim 2, wherein at least two of said load-bearing rollers are coupled respectively with one or said flaring strand rollers for accommodating one flaring strand each, whereby the two pairs of one flaring strand roller and a load-bearing strap roller respectively are rotationally coupled on each side of a transmission unit in reference to the flight direction by a rotational axle.

13. A control assembly according to claim 3, wherein at least two of said load-bearing rollers are coupled respectively with one or said flaring strand rollers for accommodating one flaring strand each, whereby the two pairs of one flaring strand roller and a load-bearing strap roller respectively are rotationally coupled on each side of a transmission unit in reference to the flight direction by a rotational axle.

14. A control assembly according to claim 4, wherein at least two of said load-bearing rollers are coupled respectively with one or said flaring strand rollers for accommodating one flaring strand each, whereby the two pairs of one flaring strand roller and a load-bearing strap roller respectively are rotationally coupled on each side of a transmission unit in reference to the flight direction by a rotational axle.

15. A control assembly according to claim 9, wherein at least two of said load-bearing rollers are coupled respectively with one or said flaring strand rollers for accommodating one flaring strand each, whereby the two pairs of one flaring strand roller and a load-bearing strap roller respectively are rotationally coupled on each side of a transmission unit in reference to the flight direction by a rotational axle.

16. A control mechanism according to claim 2, wherein said latching mechanism includes latching elements provided on the control unit that fix various latching positions in interaction with the latching apparatus for adapting the flaring traction path to control lift over time during flaring.

17. A control mechanism according to claim 3, wherein said latching mechanism includes latching elements provided on the control unit that fix various latching positions in interaction with the latching apparatus for adapting the flaring traction path to control lift over time during flaring.

18. A control mechanism according to claim 4, wherein said latching mechanism includes latching elements provided on the control unit that fix various latching positions in interaction with the latching apparatus for adapting the flaring traction path to control lift over time during flaring.

19. A control assembly according to claim 1, wherein an adjusting device is provided for adjusting the flaring traction path with which the adjustment of the flaring traction path can take place manually or through a regulating or controlling device.

20. A control assembly according to claim 1, wherein a braking apparatus is provided with which adjustment of braking action can be adapted to the cable line speed of the flaring strand upon unlatching of the latching mechanism.

21. A control assembly according to claim 20, wherein one adjustment device is provided for adjusting the braking action upon rolling off the flaring strand with which the adjustment of the braking action can take place manually or through a regulation and controlling apparatus.

22. A control assembly according to claim 11, wherein the controller includes an unlatching apparatus for unlatching the latching mechanism which has a latching element interacting with the transmission unit,
wherein a compensation apparatus is provided in the form of a pivoted balancing beam forming first and second lever arms,
wherein a first prestress apparatus acts in accordance with its deflection upon the first lever arm, whereby the deflection of the first prestress apparatus is determined by the tensile force of a first strand connected with a weight, whereby the weight hangs from the unlatching apparatus at a predetermined distance that corresponds to a predetermined target altitude for triggering the flaring maneuver,
wherein a second strand connected with the weight is connected with the second lever arm so that a tensile force corresponding to the weight acts upon the second lever arm,
wherein, a second prestress apparatus can optionally act upon this second lever arm that exerts on this a spring force opposed to the tensile force exerted by the second strand, and
wherein the first lever arm and the spring force engaging upon this as a function of the rotation position of the balancing beam as well as the second lever arm and the spring forces engaging upon this as a function of the balancing beam as well as the weight are dimensioned such that the balancing beam rotates when the weight is subjected to stress in the direction of the force of gravity.

23. A control assembly according to claim 12, wherein the controller includes an unlatching apparatus for unlatching the latching mechanism which has a latching element interacting with the transmission unit,
wherein a compensation apparatus is provided in the form of a pivoted balancing beam forming first and second lever arms,
wherein a first prestress apparatus acts in accordance with its deflection upon the first lever arm, whereby the deflection of the first prestress apparatus is determined by the tensile force of a first strand connected with a weight, whereby the weight hangs from the unlatching apparatus at a predetermined distance that corresponds to a predetermined target altitude for triggering the flaring maneuver,
wherein a second strand connected with the weight is connected with the second lever arm so that a tensile force corresponding to the weight acts upon the second lever arm,
wherein, a second prestress apparatus can optionally act upon this second lever arm that exerts on this a spring force opposed to the tensile force exerted by the second strand, and wherein the first lever arm and the spring force engaging upon this as a function of the rotation position of the balancing beam as well as the second lever arm and the spring forces engaging upon this as a function of the balancing beam as well as the weight are dimensioned such that the balancing beam rotates when the weight is subjected to stress in the direction of the force of gravity.

24. Load-bearing paraglider system with a control unit having a transmission unit for implementation of controlling flight maneuvers on the basis of activating a flaring strand using the force of the weight of the load with a load-bearing paraglider with a trailing edge, with paraglider straps that connect the load-bearing paraglider with the control unit, with a load suspended on the load-bearing paraglider using load-bearing straps and with at least one flaring strand connected with the trailing edge, wherein the control unit includes:

a transmission unit with at least two load-bearing rollers for same direction rolling up of respectively two load-bearing straps for accommodating the flare strand, whereby at least two load-bearing rollers and at least one flaring strand roller are coupled in the direction of rotation, whereby at least one flaring strand is rolled up so that the load-bearing straps are rolled off in a predetermined direction of rotation when at least one flaring strand is rolled up in the same direction of rotation, and an unlatching apparatus for unlatching the transmission unit as well as an altitude sensor for measuring the momentary flight altitude of the load and a comparison apparatus for comparing the altitudes measured with a target altitude are provided so that the comparison apparatus can activate the unlatching apparatus upon reaching the target altitude.

25. Load-bearing paraglider system with a control unit having a transmission unit for implementing controlled flight maneuvers on the basis of the activation of a flaring strand, with a load hanging on the load-bearing paraglider using load-bearing straps and with at least one flaring strand connected with the trailing edge for implementing controlled and curved flight maneuvers on the basis of activating the flaring maneuver, wherein the control unit includes:

a transmission unit with at least two load-bearing rollers for same direction rolling up of respectively two load-bearing straps as well as at least one flaring strand roller for accommodating a flaring strand, whereby at least two load-bearing rollers and at least one flaring strand roller are coupled in the direction of rotation, whereby at least one flaring strand is rolled up on the allocated flaring strand roller so that the load-bearing straps are rolled off in a predetermined direction of rotation when at least one flaring strand is rolled up in the same direction of rotation, so that the activation of the flaring strand results during a raising of the load-bearing paraglider with a simultaneous activation of the trailing edge, and an unlatching apparatus for unlatching the transmission unit as well as an altitude sensor for measuring the momentary flight altitude of the load and a comparison apparatus for comparing the altitudes measured with a target altitude are provided so that the comparison apparatus can activate the unlatching apparatus upon reaching the target altitude.

26. A load bearing paraglider system including a paragrlider, a load carried by the paraglider and a control mechanism for controlling a paraglider trailing edge section to implement flaring maneuvers of the paraglider utilizing gravity force acting on the load upon relative movement of the load and the paraglider, said control mechanism comprising:

a rotative load bearing roller with a load bearing strap wound thereon which in use supports the load, a rotatable flaring strand roller with a flaring strand wound thereon which flaring strand in use is connected with an air foil control section of the paraglider, said load bearing roller and said flaring strand roller being coupled to one another such that when rotated together in one rotational direction, the load bearing strand is unwound from the load bearing roller and the flaring strand is wound onto the flaring strand roller whereby the distance between the flaring strand roller and the air foil control section of the paraglider is shortened to thereby move the air foil section when the load bearing roller is rotated in said rotational direction by load forces from the load acting on the load bearing strap, a latching mechanism operable to selectively latch the load bearing roller and flaring strand roller to prevent rotation, thereof unlatching apparatus for unlatching the latching mechanism, and a controller responsive to a signal indicative of a distance between a local ground surface and the load to control unlatching of the latching mechanism.

* * * * *